F. VOLK.
TROLLEY BASE.
APPLICATION FILED NOV. 3, 1908.
933,505.
Patented Sept. 7, 1909.
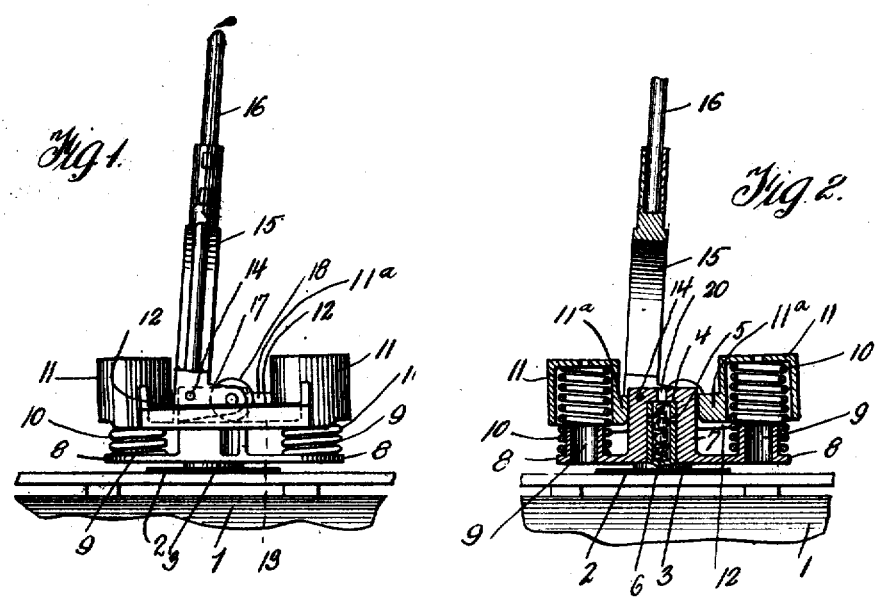
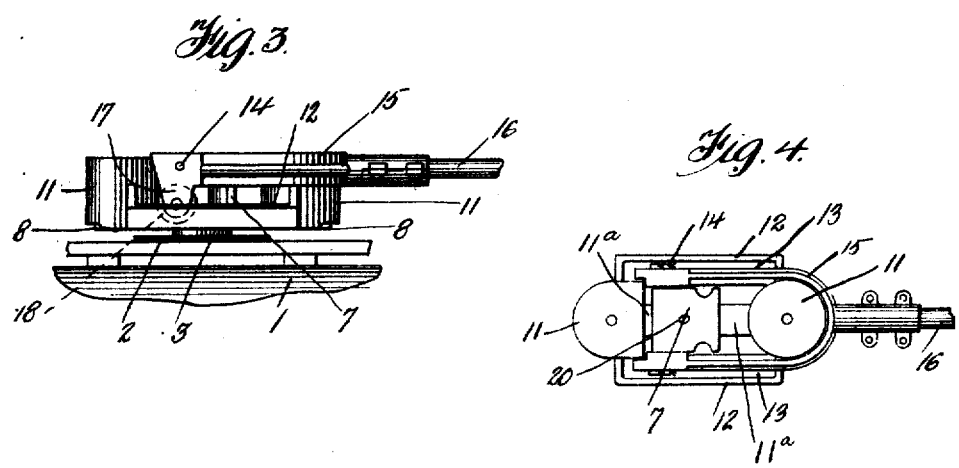

UNITED STATES PATENT OFFICE.

FERDINAND VOLK, OF PITTSBURG, PENNSYLVANIA.

TROLLEY-BASE.

933,505.      Specification of Letters Patent.      Patented Sept. 7, 1909.

Application filed November 3, 1908. Serial No. 460,920.

*To all whom it may concern:*

Be it known that I, FERDINAND VOLK, a citizen of the United States of America, residing at Pittsburg, in the county of Allegheny and State of Pennsylvania, have invented certain new and useful Improvements in Trolley-Bases, of which the following is a specification, reference being had therein to the accompanying drawing.

This invention relates to a trolley base, and the primary object of my invention is to provide a novel revoluble trolley base wherein positive and reliable means are employed for normally holding a trolley pole under tension.

A further object of this invention is to provide a simple, inexpensive and durable trolley base having oppositely disposed vertical springs indirectly connected to a trolley pole for normally maintaining the same in an upright position.

My invention aims to provide an antifrictional spring connection for trolley poles, established by the employment of roller bearings, which engage a movable spring housing.

My trolley base is designed to maintain an equal pressure of the trolley wheel upon a wire with the varied position of a trolley pole, thereby preventing trolley wheel displacement, and insuring a coöperation of the working elements of a street car.

The detail construction entering into my invention will be presently described and then specifically claimed.

In the drawings, Figure 1 is a side elevation of the trolley base with the trolley pole thereof almost in a vertical position, Fig. 2 is a vertical longitudinal sectional view, Fig. 3 is a side elevation with the trolley pole in a horizontal position, and Fig. 4 is a plan of the same.

In the accompanying drawings, 1 designates the top of a car provided with a circular plate 2 of an insulating material, as fiber. Mounted upon the plate 2 is a circular bearing plate 3 having a central tubular pin 4 provided with small lubricant openings 5. In the pin 4 is placed waste or a similar material 6.

Revolubly mounted upon the bearing plate 3 and surrounding the pin 4 is a cap 7 having longitudinal extensions 8 provided with vertical tubular posts 9. Surrounding said posts and bearing upon the extensions 8 are coil springs 10, and mounted upon the upper ends of said springs are housings 11 connected at the sides thereof by longitudinal flanged rails 12, the inwardly projecting flanges 13 of said rails serving functionally as tracks. Each housing 11 has on the side adjacent the cap 7, a lug 11ª, which lugs hold the frame formed by the rails 12 and housings 11 against tilting movement. The sides of the cap 7 are provided with trunnions 14 for a yoke 15 carrying a trolley pole 16. The ends of the yoke 15 are provided with lugs 17 and revolubly connected to said lugs are wheels or rollers 18 adapted to ride upon the flanges 13 of the longitudinal rails 12. The lugs 17 are arranged at an angle to the ends of the yoke 15, whereby the tension of the springs 10 will normally force upwardly upon the wheels or rollers 18 and maintain the trolley pole 16 approximately vertical, the extreme vertical position of the trolley pole being limited by the lower end of the yoke 15 engaging the track flanges 13 of the rails 12. The cap 7 is provided with a central opening 20 whereby a lubricant can be placed upon the waste 6 within the pin 4.

Operation: When the trolley pole 16 is pulled downwardly with the trunnions 14 as a pivot point, the spring 10 at the right hand side of the trolley base (as viewed in the drawings) is placed under tension slightly in advance of the spring on the left hand side thereof, but as the trolley pole travels downwardly and the wheels or rollers 18 travel toward the pivot point of the trolley pole, the pressure is distributed and both springs are under tension as shown by the position of the housings 11 in Fig. 3 of the drawings.

The novel manner in which the trolley pole is trunnioned and the use of the wheels or rollers 18 provides an equalizing device which insures positive and simultaneous action of the springs 10.

I reserve the right to use anti-friction balls in lieu of the wheels or rollers 18; to substitute skeleton inclosures for the springs 10; to employ suitable insulating material where necessary; to use springs of various types and to make various changes in the details of construction, as to the shape, proportion and manner of assemblage without departing from the spirit of the invention as defined in the appended claims.

Having now described my invention, what I claim as new is;—

1. A trolley base comprising a bearing plate, a tubular pin carried thereby, a cap revolubly mounted upon said pin and having longitudinal extensions provided with tubular posts, coil springs encircling said posts, housings mounted upon said springs, longitudinal rails connecting said housings and providing tracks, a yoke trunnioned upon said cap and adapted to support a trolley pole, angularly disposed lugs carried by the ends of said yoke, wheels revolubly connected to said lugs and adapted to travel upon the tracks of said rails, and means whereby the bearing between said cap and pin can be lubricated.

2. A trolley base comprising a bearing plate, a tubular pin carried thereby, a cap revolubly mounted upon said pin and having longitudinal extensions provided with tubular posts, coil springs encircling said posts, housings mounted upon said springs, longitudinal rails connecting said housings and providing tracks, a yoke trunnioned upon said cap and adapted to support a trolley pole, angularly disposed lugs carried by the ends of said yoke, and wheels revolubly connected to said lugs and adapted to travel upon the tracks of said rails.

3. A trolley base comprising a revoluble cap, tubular posts carried thereby, springs encircling said posts, housings mounted upon said springs, rails connecting said housings, a yoke trunnioned upon said cap and adapted to support a trolley pole, and wheels revolubly carried by said yoke for engaging said rails and placing said springs under tension when said yoke is lowered.

4. A trolley base comprising a pin, a revoluble cap mounted upon said pin, spring-supported housings carried by said cap, rails connecting said housings, a yoke trunnioned upon said cap for supporting a trolley pole, and anti-friction means carried by said yoke and engaging said rails for placing the springs of said housings under tension when said yoke is lowered.

5. A trolley base comprising a cap support, a cap revolubly-mounted on said support, springs carried by the cap, housings mounted on the springs, tracks connecting the housings, a yoke connected to the cap, and means carried by the yoke to engage the said tracks and simultaneously depress said housings to place the aforesaid springs under tension.

In testimony whereof I affix my signature in the presence of two witnesses.

FERDINAND VOLK.

Witnesses:
MAX H. SKOLOVITZ,
A. J. TRIGG.